United States Patent

Jun-Young

[11] Patent Number: 5,565,853
[45] Date of Patent: Oct. 15, 1996

[54] FUNCTION CONTROL DEVICE MANAGING ENERGY CONSUMPTION FOR A MOBILE SYSTEM POWERED BY A BATTERY

[75] Inventor: Jeong Jun-Young, Seoul, Rep. of Korea

[73] Assignee: Samsung Electronics Co., Ltd., Kyungki-Do, Rep. of Korea

[21] Appl. No.: 442,758

[22] Filed: May 17, 1995

Related U.S. Application Data

[63] Continuation of Ser. No. 9,951, Jan. 27, 1993, abandoned.

[30] Foreign Application Priority Data

Jan. 27, 1992 [KR] Rep. of Korea ............... 92-1128

[51] Int. Cl.$^6$ ..................................................... G08B 21/00
[52] U.S. Cl. ............................................. 340/636; 340/635
[58] Field of Search ............................ 340/636, 635; 307/64, 65, 66; 136/243, 291; 323/285, 266; 395/80, 91, 93; 364/424.02, 424.03; 385/568.11, 568.12

[56] References Cited

U.S. PATENT DOCUMENTS

| | | | |
|---|---|---|---|
| 4,193,026 | 3/1980 | Finger et al. | 324/428 |
| 4,490,715 | 12/1984 | Kusanagi et al. | 340/634 |
| 4,573,548 | 3/1986 | Holland | 180/211 |
| 4,665,370 | 5/1987 | Holland | 324/429 |
| 4,683,859 | 8/1987 | Tamura | 123/491 |
| 4,704,542 | 11/1987 | Hwang | 307/66 |
| 4,820,966 | 4/1989 | Fridman | 320/32 |
| 5,049,805 | 9/1991 | Celenza et al. | 307/66 |
| 5,083,968 | 1/1992 | Hart | 446/431 |
| 5,173,832 | 12/1992 | Giorgetta | 361/88 |
| 5,202,661 | 4/1993 | Everett, Jr. et al. | 340/522 |
| 5,265,022 | 11/1993 | Chonan et al. | 364/431.04 |
| 5,352,982 | 10/1994 | Nakazawa et al. | 340/636 |
| 5,440,916 | 8/1995 | Stone et al. | 73/23.31 |

*Primary Examiner*—Jeffery Hofsass
*Assistant Examiner*—Ashok Mannava
*Attorney, Agent, or Firm*—Sughrue, Mion, Zinn, Macpeak & Seas

[57] ABSTRACT

A function control device for a mobile system which uses a battery. The control device includes a microcomputer for controlling an overall operation of the mobile system, a first voltage comparing portion for comparing a voltage level of the power source with a motor-driving minimum reference voltage and a second voltage comparing portion for comparing the voltage level of the power source with a gas sensor minimum reference voltage. The device also includes a motor driving portion for moving the mobile system, a gas sensing portion for sensing gas leaks an intruder sensing portion for sensing whether an intruder is present, a fire sensing portion for sensing fires and an alarm for generating a warning sound when at least one of the above problems is sensed. When the voltage level of the battery falls below the gas sensing reference voltage and/or the motor driving reference voltage, the system deactivates the gas sensor and/or the motor driver.

15 Claims, 3 Drawing Sheets

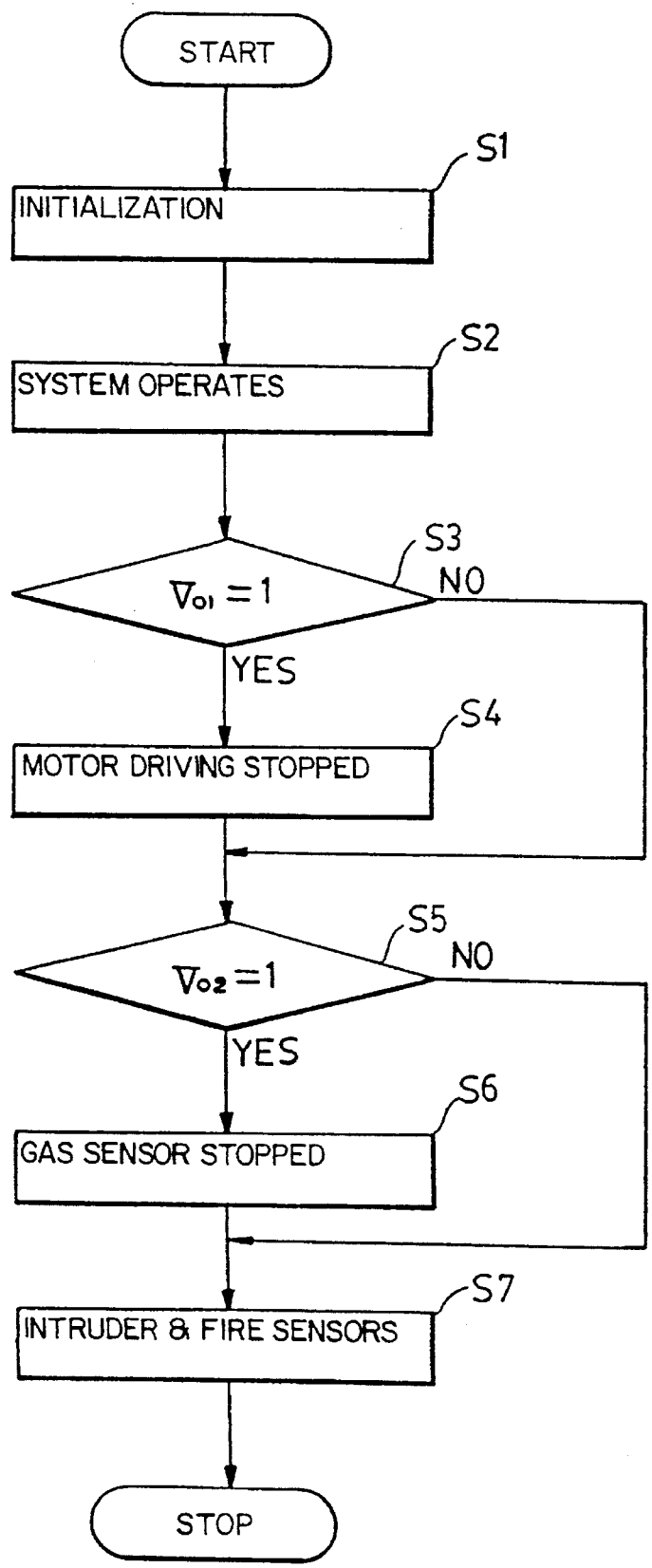

5,565,853

FUNCTION CONTROL DEVICE MANAGING ENERGY CONSUMPTION FOR A MOBILE SYSTEM POWERED BY A BATTERY

This is a continuation of application Ser. No. 08/009,951 filed Jan. 27, 1993 now abandoned

FIELD OF THE INVENTION

The present invention relates to a function control device for a mobile system that uses a battery, and more particularly to a function control device which detects a decrease in the voltage output from the battery in response to a driving operation of the mobile system. When voltage decreases are detected, the invention sequentially cuts off functions, which consume a lion's share of the stored power, whereby the battery usage is maximized and the operational period of the mobile system is extended.

BACKGROUND OF THE INVENTION

A conventional mobile system for crime and disaster prevention, utilizing a battery as a single power source, consumes lots of power in a short time period because it performs complex functions, including a motor driving function and a gas leak sensing function. When a battery is used as a power source for this kind of mobile system, it is impossible to use the battery continuously for a long time period due to its limited capacity. Further, when a normal operation (e.g., when all the functions are performed) is executed, the battery voltage decreases drastically, until operation of the mobile system is completely stopped and the desired functions are not performed. Thus, in previous systems, to use the mobile system for a long period of time, it was necessary to use a battery having a large capacity. However, batteries having sufficient capacity are undesirably large and heavy.

SUMMARY OF THE INVENTION

Accordingly, the present invention has been contrived while taking the above and other considerations into account. It is an object of the present invention to provide a battery having a limited capacity, which can still maximize an operational period of the system. The battery is maximized by allowing only a portion of the system's functions to be performed when the battery voltage drops below a regulated value in response to the operation of the system. The system uses a microcomputer to stop those functions which consume relatively large quantities of power.

In order to obtain the above-referenced objects, the invention provides a function control device of a mobile system, utilizing a battery, that comprises a power source, a microcomputer for controlling an overall operation of the mobile system, a first voltage comparing portion for comparing a voltage level of the power source with a motor-driving minimum reference voltage and a second voltage comparing portion for comparing the voltage level of the power source with a minimum reference voltage which drives a gas sensing portion. The control device also includes a motor driving portion for moving the mobile system, a gas sensing portion for sensing gas leaks, an intruder sensing portion for sensing intruders, a fire sensing portion for sensing fires and an alarm for generating a warning sound when at least one of the above gas, intruder and fire sensing portions has sensed a signal resulting from an abnormal condition.

BRIEF DESCRIPTION OF THE DRAWINGS

For a fuller understanding of the nature and objects of the invention, reference should be made to the following detailed description taken in conjunction with the accompanying drawings in which:

FIG. 3 is a flow chart illustrating an operation sequence of a function control device of a mobile system utilizing a battery in accordance with the present invention.

DETAILED DESCRIPTION OF THE INVENTION

Figure 1:
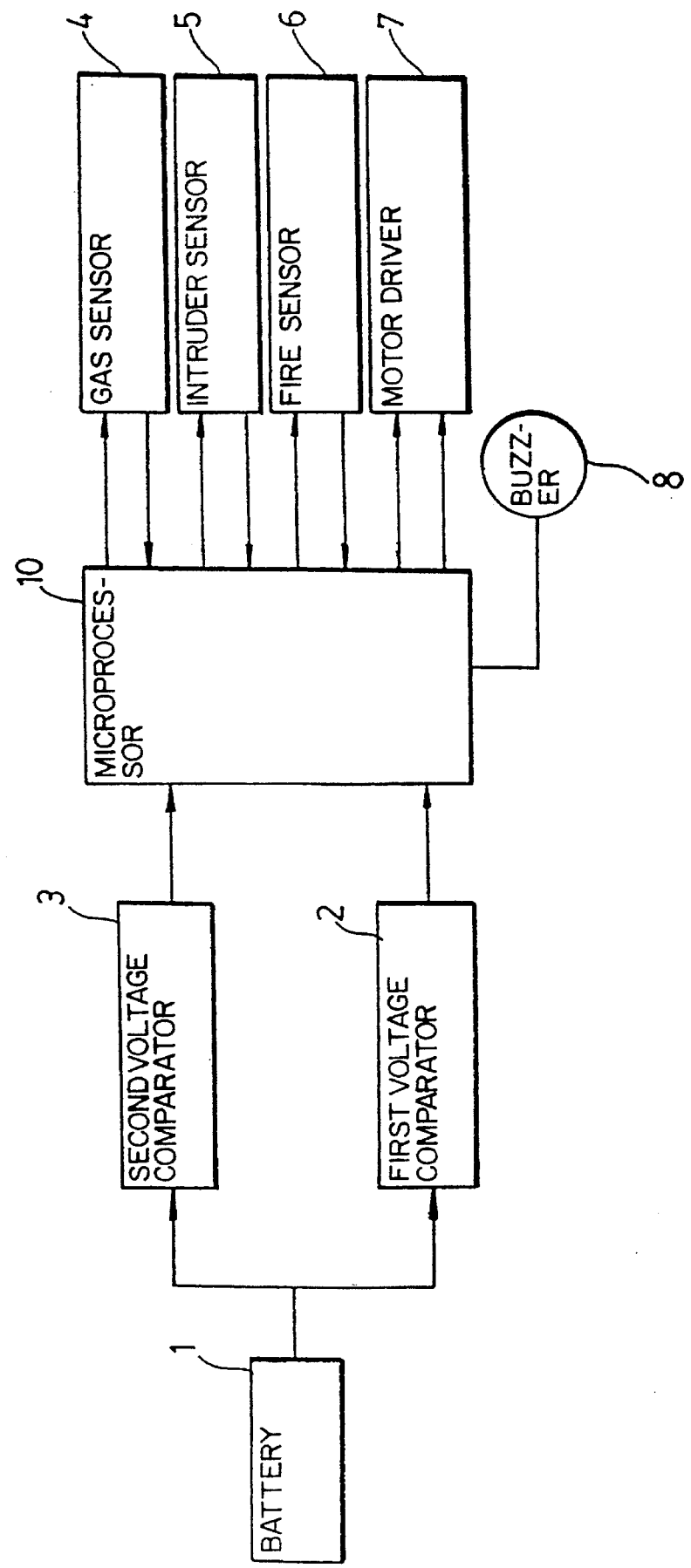
FIG. 1 is an overall control block diagram of a mobile system utilizing a battery in accordance with the present invention.

FIG. 1 is a block diagram of the present mobile system which utilizes a battery. The system includes a battery power source 1, a first voltage comparing portion 2 which compares a voltage level of the battery 1 with a motor-driving minimum reference voltage. The first voltage comparing portion supplies an output thereof to a microcomputer 10. A second voltage comparing portion 3 compares the voltage level of the battery 1 with a sensing minimum reference voltage, which drives a gas sensing portion 4. The second voltage comparing portion also supplies an output thereof to the microcomputer 10. A gas sensing portion 4 senses whether or not there is a gas leak and operates, when a gas leak exists to input a gas leakage signal to the microcomputer 10, so that a warning sound can be generated.

An intruder sensing portion 5 inputs an intruder sensing signal to the microcomputer 10, which thereafter sends out a warning Sound when an intruder is present. A fire sensing portion 6 inputs a fire sensing signal to the microcomputer 10 which thereafter sends out a warning sound when a fire exists. A motor driving portion 7 drives the motor based on signals from the microcomputer, and a buzzer 8 sends out a warning sound in response to control of the microcomputer 10 when at least one of the above sensing portions senses an abnormal condition.

Figure 2:
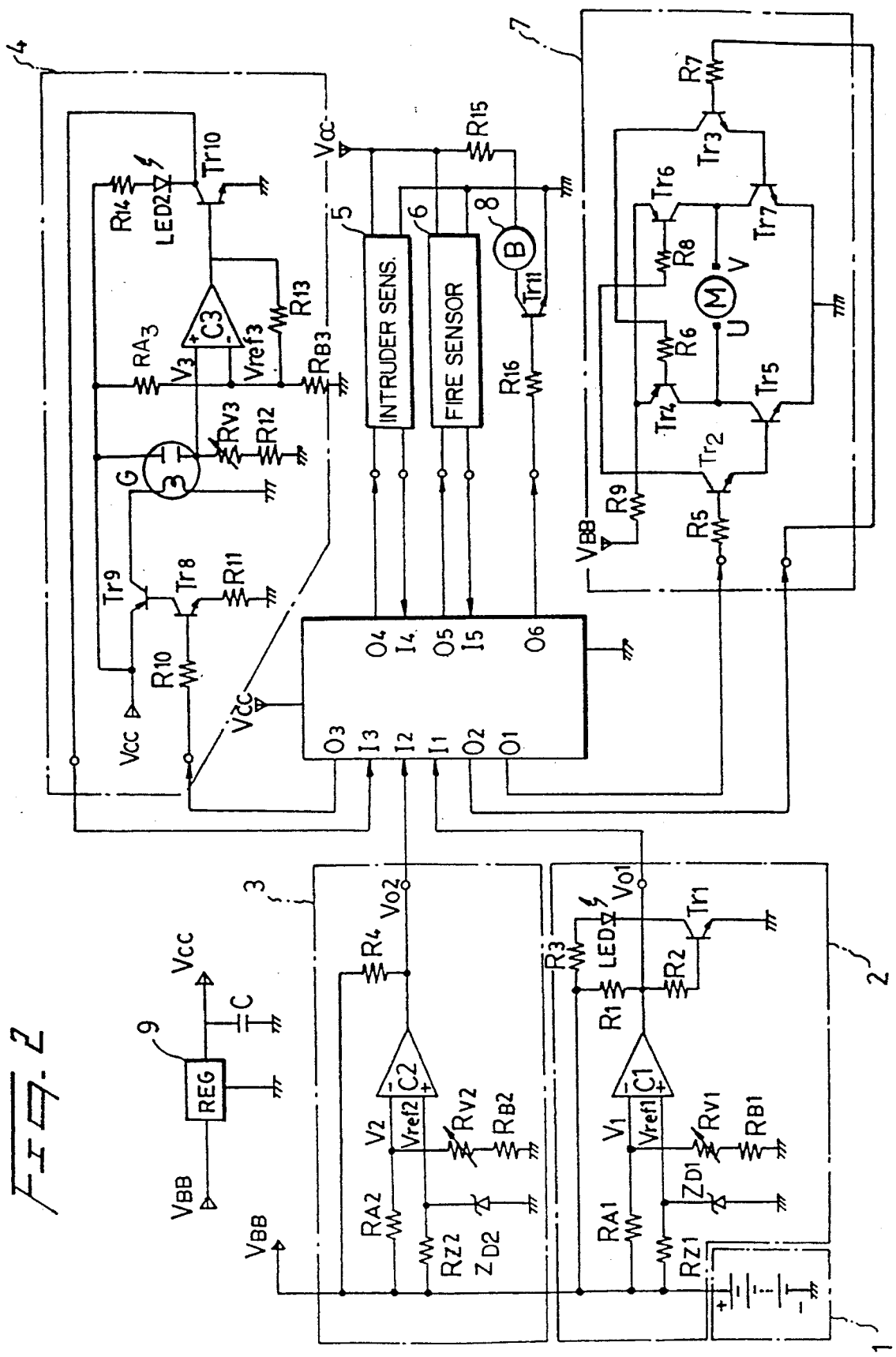
FIG. 2 is a detailed circuit diagram of FIG. 1.

Next, a function control of the mobile system, utilizing a battery in accordance with the present invention, will be described in detail with reference to FIG. 2.

The first voltage comparing portion 2 includes a Zener diode $Z_{D1}$ having a much lower break-down characteristic than that of the battery 1. The first voltage comparing portion 2 compares a voltage level $V_1$, representative of the battery output, with a motor-driving minimum reference voltage $V_{ref1}$. The reference voltage $V_{ref1}$ is generated by a resistor $R_{Z1}$ zener diode $z_{D1}$, to a non-inverting terminal "−" of a first voltage comparator $C_1$ to establish a minimum battery reference voltage. The comparing portion 2 uses resistors $R_{A1}$ and $R_{B1}$ and a variable resistor $R_{V1}$ to supply the voltage level $V_1$ of the battery 1 to an inverting terminal "−" of the first voltage comparator $C_1$.

During operation, when the voltage level $V_1$ of the battery 1 falls below the minimum reference voltage $V_{ref1}$, the first voltage comparator $C_1$ supplies a bias voltage to a base of a transistor $Tr_1$, via resistors $R_1$ and $R_2$, thereby rendering the transistor $Tr_1$ conductive. This bias voltage also causes a first light emitting diode LED1 to be emissive, in order to display an unable driving condition of the motor driving portion 1.

When $V_1 \leq V_{ref1}$ a high level signal is supplied from the first voltage comparator $C_1$ to an input terminal $I_1$ of the microcomputer 10. When the input terminal $I_1$ receives a high level, the microcomputer 10 supplies a low level to the output terminals $O_1$ and $O_2$, in order to prevent the motor M from driving the mobile system in the forward or backward direction, so that forward and backward driving cannot be executed. When $V_1 > V_{ref1}$, a low level signal is supplied from the first voltage comparator $C_1$ to the input terminal I1 of the microcomputer 10. When this low level signal is applied, the microcomputer 10 outputs a high level signal from one of the output terminals $O_1$ or $O_2$, in order to drive the motor, so that the mobile system can be driven in a forward or backward direction.

For instance, when a high level signal is output from the output terminal $O_2$ and a low level signal is outputted from the output terminal $O_1$, a bias voltage is supplied, via a resistor $R_7$, to a base of a transistor $Tr_3$, thereby rendering the transistor conductive/ON. Once the transistor $Tr_3$ is rendered conductive/ON, a second transistor $Tr_7$ is also rendered conductive and a terminal V of the motor M is supplied with a negative "−" voltage. The transistor $Tr_3$ also renders, via a resistor $R_6$, a transistor $Tr_4$ conductive, so that a terminal U of the motor M is connected to, and supplied with, a positive "−" voltage. Connecting terminals V and U with negative and positive voltages, respectively, cause the motor M to rotate in the forward direction to thereby drive the mobile system in a forward direction.

In the above example, when the output terminal $O_1$ of the microcomputer 10 is supplied with a low level signal, the transistors $Tr_2$, $Tr_6$ and $Tr_8$ are rendered non-conductive/OFF, thereby preventing the motor M from rotating in the backward direction.

Conversely, when a terminal $O_1$ of the microcomputer 10 is supplied with a high level signal and the terminal $O_2$ is supplied with a low level signal, a bias voltage is supplied to the base of the transistor $Tr_2$ through a resistor $R_5$ to thereby render the transistor $Tr_2$ conductive/ON. Accordingly, when the transistor $Tr_2$ is conductive, the transistor $Tr_5$ is also rendered conductive, so that the terminal U of the motor M is supplied with a negative "−" voltage. Furthermore, the transistor $Tr_2$ also supplies a bias voltage, via a resistor $R_8$, to the base of a transistor $T_6$, to thereby render the transistor $Tr_6$ conductive. Thus, a positive "−" voltage level (from the battery 1) is supplied to the terminal V of the motor M through the terminal VBB. The motor M is thereafter rotated in the backward direction, causing the mobile system to run backward.

The second voltage comparing portion 3 compares the voltage level of the battery 1 with a minimum reference voltage $V_{ref2}$ which is necessary to drive the gas sensing portion 4. The second voltage comparing portion 3 is connected to a zener diode $Z_{D2}$ having a much lower breakdown characteristic than that of the source voltage of the battery 1 (similar to the zener diode $Z_{D1}$ in the first voltage comparing portion 2). The non-inverting terminal "−" of the second voltage comparator $C_2$ is connected to a resistor $R_{22}$. The zener diode $Z_{D2}$ and the resistor $R_{Z2}$ produce the minimum reference voltage $V_{ref1}$ which can drive the gas sensing portion 4 to thereby establish a second lowest voltage for the battery 1. Resistors $R_{A2}$ and $R_{B2}$, and a variable resistor $R_{V2}$ are used to produce a voltage level $V_2$, representative of the battery output, at an inverting terminal "−" of the second voltage comparator $C_2$. When the minimum reference voltage $V_{ref2}$ of the second voltage comparator $C_2$ is higher than the voltage level $V_2$ (i.e., $V_2 \leq V_{ref2}$), a high level signal is supplied from the second voltage comparator $C_2$ to an input terminal $I_2$ of the microcomputer 10. Thereafter a low level signal is output from an output terminal $O_3$ of the microcomputer 10 to render the gas sensing portion 4 inoperable.

When $V_2 > V_{ref2}$, a low level signal is supplied from the second voltage comparator $C_2$ to the input terminal $I_2$ of the microcomputer 10 and, in response thereto, the microcomputer outputs a high level from the output terminal $O_3$, thereby directing the gas sensing portion 4 to remain operative. When a high level signal is output from the output terminal $O_3$, transistors $Tr_8$ and $Tr_9$ are rendered conductive, via a resistor $R_{10}$, and a voltage potential $V_{cc}$ is supplied to a gas sensor G, thereby rendering it operable.

In the gas sensing portion 4, when gas is not present, a gas detecting voltage $V_3$ supplied to a non-inverting terminal "−" of the third voltage comparator $C_3$, is connected to ground through a resistor $R_{12}$ and a variable resistor $R_{V3}$. A voltage $V_{cc}$, representing a gas detection reference voltage $V_{ref1}$, is input to a non-inverting terminal "−" of a third voltage comparator $C_3$, through a resistor $R_{A3}$. The third voltage comparator $C_3$ outputs a low level signal when no gas leak is detected to turn OFF a transistor $Tr_{10}$. Accordingly, the second light emitting diode LED2 is not turned ON.

Meanwhile, when gas is leaked, the gas sensor G of the gas sensing portion 4 is rendered conductive, thereby raising the gas detecting voltage $V_3$ of the third voltage comparator $C_3$ above the gas detection reference voltage $V_{ref3}$. In response thereto, the third voltage comparator $C_3$ outputs a high level signal. Therefore, the transistor $Tr_{10}$ is rendered conductive to thereby make the second light emitting diode LED2 operable. When the transistor $Tr_{10}$ is conductive, an output signal of the second light emitting diode LED2 is input to a terminal $I_3$ of the microcomputer, which now outputs a high level signal from a terminal $O_6$ in response thereto. The high level signal from the terminal $O_6$ inputs a bias voltage to a base of a transistor $Tr_{11}$, through a resistor $R_{16}$, rendering it conductive. Thereafter, a voltage $V_{cc}$ is applied to a buzzer 8, through a resistor $R_{15}$, to send out an alarming sound.

Next, the intruder and fire detection circuits will be explained.

First, a high level signal is output from an output terminal $O_4$ of the microcomputer 10 in order to keep the intruder sensing portion 5 operable. Thereafter, when an intruder is detected, the intruder sensing portion 5 supplies an output signal to an input terminal $I_4$ of the microcomputer 10. In response thereto, the microcomputer outputs a high level signal at terminal $O_6$ to render a transistor $Tr_{11}$ conductive. Once the transistor $Tr_{11}$ is conductive, a warning sound is sent out from the buzzer 8 just as an alarm sound is generated during the detection of a gas leak.

As seen from the foregoing, a high level signal is output from a terminal $O_5$ of the microcomputer 10 in order to maintain the fire sensing portion 6 operative. When a fire occurs, the fire sensing portion 6 supplies an output signal to a terminal $I_5$ of the microcomputer 10. In response thereto, the microcomputer outputs a high level signal from an output terminal $O_6$ to cause the buzzer 8 to send out an alarming sound. A voltage regulator 9 (FIG. 2) attenuates an output voltage of the battery 1.

Next, an operation sequence of the function control device of the mobile system will be described with reference to a flow chart in FIG. 3. The reference numeral S in FIG. 3 represents the step. First, when the microcomputer is turned on, it establishes an initialization value at step S1, and the flow proceeds to step S2. At step S2, the gas sensing portion 4, intruder sensing portion 5, fire sensing portion 6 and motor driving portion 7 are all driven to execute functions of the mobile system. Thereafter, step S3 discriminates whether an output voltage $V_{O1}$ of the first voltage comparing portion 2 is at a high level. When this output voltage is high (i.e., when the voltage level of the battery is below the first threshold), flow advances to step S4. Since the voltage level of the battery 1 is too low to operate the motor M, the function control device stops driving the motor.

Next, flow proceeds to step S5, at which the system discriminates whether or not an output voltage $V_{O2}$ of the second voltage comparing portion 2 is "1" (i.e., at a high level), and if the answer is YES, flow proceeds to step S6. Since a YES at step S5 indicates that the voltage level of the battery 1 is too low to operate the gas sensing portion 4, the system stops operation of the gas sensing portion 4.

Next, at step S7, the fire sensing portion 6 and the intruder sensing portion 5 of the mobile system are operated. Thus, when the voltage level of the battery is below the first and second reference voltages $V_{O1}$ and $V_{O2}$, the system disables the motor driving and gas sensing functions, to minimize the power consumption by allowing only the fire and intruder sensing functions to be performed.

As seen in the foregoing, when the present function control device for a mobile system determines that it will be impossible to operate the mobile system for an extended period of time due to large power consumption, the system temporarily stops the motor driving and gas sensing functions, which consume a majority of the power. The fire and intruder sensing functions and the like which consume less power are still executed continuously, so that the mobile system is operative for a longer period of time.

What is claimed is:

1. A function control device in a mobile system for crime and disaster prevention, said mobile system being propelled by an electric motor and utilizing a battery as a sole power source, said function control device comprising:

the power source;

a microcomputer for continuously controlling overall operation of the mobile system;

motor driving means, connected to said microcomputer, for moving said mobile system by rotating the electric motor;

first comparator means, connected to said power source and said microcomputer, for comparing a voltage level of said power source with a motor driving minimum reference voltage, said microcomputer deactivating said motor driving means when said first comparator means outputs a signal indicating that said voltage level of said power source is below said motor driving minimum reference voltage.

2. The function control device in a mobile system, according to claim 1, wherein said first comparator means comprises:

a first voltage comparator having a non-inverting terminal connected between a first resistor and a first Zener diode wherein said first resistor is electrically coupled to said power source, said first resistor and said first Zener diode cooperatively producing said motor driving minimum reference voltage, said first voltage comparator having an inverting terminal connected between two first ground resistors which form a series connection between said power source and ground, said two first ground resistors producing a first voltage representative of said voltage level of said power source, said microcomputer controlling a motor driving function based on a comparison by said first voltage comparator between voltages at said inverting and non-inverting terminals.

3. The function control device in a mobile system, according to claim 1, further comprising:

gas sensing means, connected to said microcomputer, for sensing gas leaks; and second comparator means, connected to said power source and said microcomputer, for comparing said voltage level of said power source with a gas sensor minimum reference voltage, said microcomputer deactivating said gas sensing means when said second comparator means outputs a signal indicating that said voltage level of said power source is below said gas sensor minimum reference voltage.

4. The function control device in a mobile system, according to claim 3, wherein said second comparator means comprises:

a second voltage comparator having a non-inverting terminal connected between a second resistor and a second Zener diode, said second resistor and second Zener diode being connected between said power source and ground in order to produce said gas sensor minimum reference voltage, said second voltage comparator having an inverting terminal connected between two second ground resistors which form a series connection between said power source and ground, producing said gas sensor minimum reference voltage, said microcomputer controlling said gas sensing means based on a comparison by said second voltage comparator between voltages at said inverting and non-inverting terminals.

5. The function control device in a mobile system, according to claim 1, further comprising:

intruder sensing means, electrically coupled to said power source and electrically connected to said microcomputer, for sensing a presence of intruders;

fire sensing means, electrically coupled to said power source and electrically connected to said microcomputer, for sensing fires; and alarm means electrically connected to said microcomputer for generating an audible warning when any one of said intruder and fire sensing means detects an abnormal condition.

6. The function control device in a mobile system, according to claim 5, wherein said microcomputer conserves power by deactivating said motor driving means when said voltage level of said power source is below said motor driving minimum reference voltage.

7. The function control device in a mobile system, according to claim 5, further comprising:

gas sensing means, connected to said microcomputer, for sensing gas leaks; and second comparator means, connected to said power source and said microcomputer, for comparing said voltage level of said power source with a gas sensor minimum reference voltage, said microcomputer deactivating said gas sensing means when said second comparator means outputs a signal indicating that said voltage level of said power source is below said gas sensor minimum reference voltage, wherein said microcomputer conserves power by deactivating said gas sensing means and allowing said intruder and said fire sensing means to remain active when said voltage level of said power source is below said gas sensor minimum reference voltage.

8. A function control device in a mobile system for crime and disaster prevention propelled by an electric motor and powered by a single battery, comprising:

a microcomputer for controlling overall operation of the mobile system;

a motor driver, connected to said microcomputer, for moving said mobile system by rotating the electric motor;

a first comparator connected to the battery and said microcomputer, for comparing a voltage level of the battery with a motor driving minimum reference voltage, said microcomputer deactivating said motor driver responsive to a signal generated by said first comparator indicating that said voltage level of the battery is below said motor driving minimum reference voltage.

9. The function control device as recited in claim 8, wherein said first comparator comprises:

a first voltage comparator having a non-inverting terminal connected between a first resistor and a first Zener diode wherein said first resistor is electrically coupled to the battery, said first resistor and said first Zener diode cooperatively producing said motor driving minimum reference voltage, said first voltage comparator having an inverting terminal connected between two first ground resistors which form a series connection between the battery and ground, said two first ground resistors producing a first voltage representative of said voltage level of the battery, said microcomputer controlling a motor driving function based on a comparison by said first voltage comparator between voltages at said inverting and non-inverting terminals.

10. The function control device as recited in claim 8, further comprising:

a gas sensor connected to said microcomputer, for sensing gas leaks; and a second comparator connected to the battery and said microcomputer, for comparing said voltage level of the battery with a gas sensor minimum reference voltage, said microcomputer deactivating said gas sensor when said second comparator outputs a signal indicating that said voltage level of the battery is below said gas sensor minimum reference voltage.

11. The function control device as recited in claim 10, wherein said second comparator comprise:

a second voltage comparator having a non-inverting terminal connected between a second resistor and a second Zener diode, said second resistor and second Zener diode being connected between the battery and ground in order to produce said gas sensor minimum reference voltage, said second voltage comparator having an inverting terminal connected between two second ground resistors which form a series connection between the battery and ground, producing said gas sensor minimum reference voltage, said microcomputer controlling said gas sensor based on comparison by said second voltage comparator between voltages at said inverting and non-inverting terminals.

12. The function control device as recited in claim 10, further comprising:

an intruder sensor, electrically coupled to the battery and electrically connected to said microcomputer, for sensing a presence of intruders;

a fire sensor, electrically coupled to the battery and electrically connected to said microcomputer, for sensing fires; and an audible alarm electrically connected to said microcomputer for generating a warning when any one of said intruder and said fire sensors detects a respective abnormal condition.

13. The function control device as recited in claim 8, wherein said microcomputer conserves power by deactivating said gas sensor and allowing said intruder and said fire sensors to remain active when said voltage level of the battery is below said gas sensor minimum reference voltage.

14. The function control device as recited in claim 8, further comprising:

an intruder sensor, electrically coupled to the battery and electrically connected to said microcomputer, for sensing a presence of intruders;

a fire sensor, electrically coupled to the battery and electrically connected to said microcomputer, for sensing fires; and an audible alarm electrically connected to said microcomputer for generating a warning when a respective one of said intruder and said fire sensors detects an abnormal condition.

15. The function control device as recited in claim 14, wherein said microcomputer conserves power by deactivating said voltage level of the battery is below said motor driving minimum reference voltage.

\* \* \* \* \*